United States Patent [19]

Green

[11] 4,131,513

[45] Dec. 26, 1978

[54] SEAWATER DISTILLATION APPARATUS

[76] Inventor: Harry S. Green, Rte. 1, Box 253, Wilmington, Ill. 60481

[21] Appl. No.: 787,302

[22] Filed: Apr. 13, 1977

[51] Int. Cl.² .............................................. B01D 3/02
[52] U.S. Cl. ............................... 202/185 B; 202/234; 202/189; 159/1 SF; 159/DIG. 1
[58] Field of Search .................... 202/181, 185 B, 189, 202/234, 235; 159/1 SF, DIG. 1; 165/95, 110; 219/271, 275

[56] References Cited

U.S. PATENT DOCUMENTS

| 2,398,842 | 4/1946 | Morse | 202/189 |
|---|---|---|---|
| 3,390,056 | 6/1968 | Ingram | 202/234 |
| 3,584,192 | 6/1971 | Maag | 219/275 |
| 3,977,198 | 8/1976 | Berry | 219/275 |

Primary Examiner—Hiram H. Bernstein
Attorney, Agent, or Firm—Clarence A. O'Brien; Harvey B. Jacobson

[57] ABSTRACT

A float member is provided defining a hollow chamber therein and a vertically elongated conduit depends downwardly from the float member and includes an upper portion projecting upwardly and opening into the hollow chamber to a level above the liquid level on the exterior of the float member. Heating structure is provided within the chamber in good heat transfer relation with the upper portion thereof projecting into the hollow chamber and condenser structure is provided for condensing liquid vapors. In addition, vapor conveying structure is provided and communicates the interior of the chamber with the condenser structure for conveying hot liquid vapors from the chamber into the condenser structure for condensing therein.

3 Claims, 4 Drawing Figures

SEAWATER DISTILLATION APPARATUS

BACKGROUND OF THE INVENTION

Various forms of structures for accomplishing seawater distillation have been heretofore provided. Examples of such previous structures are disclosed in U.S. Pat. Nos. 3,138,546, 3,236,747, 3,351,536, and 3,394,055. In addition, a similar seawater distillation apparatus is disclosed in my prior U.S. Pat. No. 3,580,814.

However, these previously known forms of seawater distillation apparatuses include various structural features and operating characteristics which render them less than 100% efficient in operation over extended periods of time. Accordingly, a need exists for a seawater distillation apparatus which will be capable of efficient operation over extended periods of time without requiring more than minimal maintenance.

SUMMARY OF THE INVENTION

The seawater distillation apparatus of the instant invention is constructed in a manner whereby it may be operated for extended periods of time without maintenance thereon being required. In addition, the seawater distillation apparatus includes structure whereby the apparatus may be supported from a stationary support immediately adjacent seawater which is tidal and with the changes in the level of the seawater caused by tides not adversely affecting the operation of the seawater distillation apparatus.

The main object of this invention is to provide a seawater distillation apparatus which may be stationarily mounted relative to a seawall and which includes operational components mounted on a float which may rise and fall with the tide of the associated body of seawater.

Another object of this invention is to provide an apparatus in accordance with the preceding object and constructed in a manner whereby it will be operative over extended periods of time without requiring maintenance thereon.

Yet another object of this invention is to provide a seawater distillation apparatus which may utilize electric energy as the source of heat to vaporize the seawater to be distilled, it being possible to provide the necessary electrical energy to power the seawater distillation apparatus from solar energy sources as well as domestic electrical energy sources.

A final object of this invention to be specifically enumerated herein is to provide a seawater distillation apparatus in accordance with the preceding objects and which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE INVENTION

Figure 1:
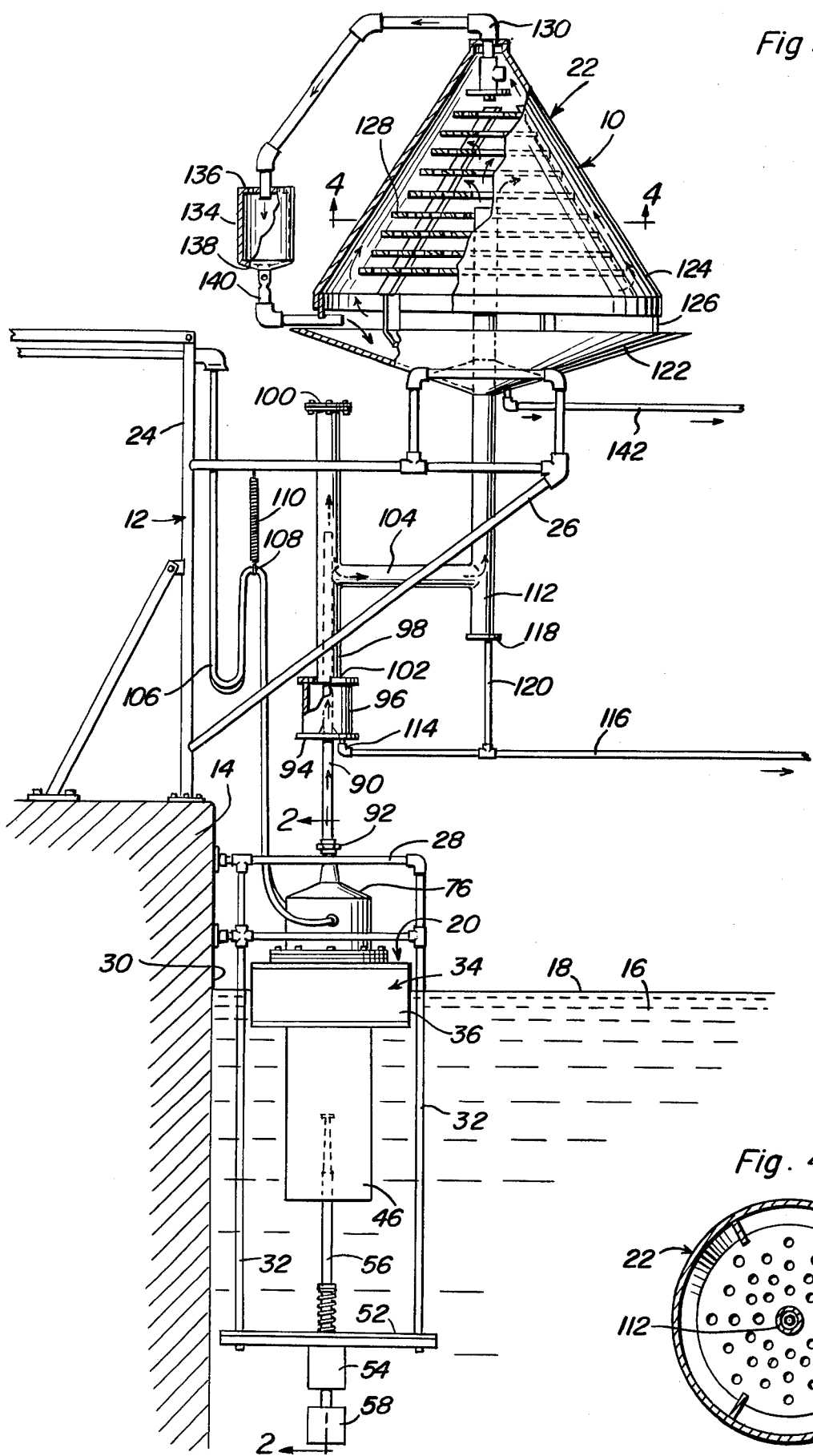
FIG. 1 is a side elevational view of the seawater distillation apparatus of the instant invention with portions of the vapor condensing structure thereof broken away and illustrated in vertical section.
Figure 4:
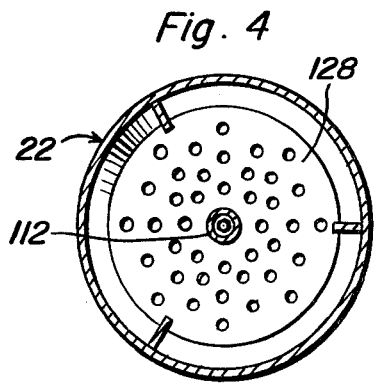
FIG. 4 is a horizontal, sectional view taken substantially upon the plane indicated by the section line 4—4 of FIG. 1.

Referring now more specifically to the drawings, the numeral 10 generally designates the water distillation apparatus of the instant invention. The apparatus 10 includes a support structure referred to in general by the reference numeral 12 stationarily mounted on a seawall 14 at the edge of a body of tidal seawater 16 whose upper level 18 varies with the tides.

The apparatus 10 further includes a seawater vaporizing section referred to in general by the reference numeral 20 and a vapor condensing section referred to in general by the reference numeral 22.

The support structure 12 includes an upper section 24 supported from the upper portion of the seawall 14 and including a cantilever portion 26 projecting outwardly over the body 16 of water. In addition, the support structure 12 includes a lower section 28 supported from the outer vertical face 30 of the seawall 14.

Figure 2:
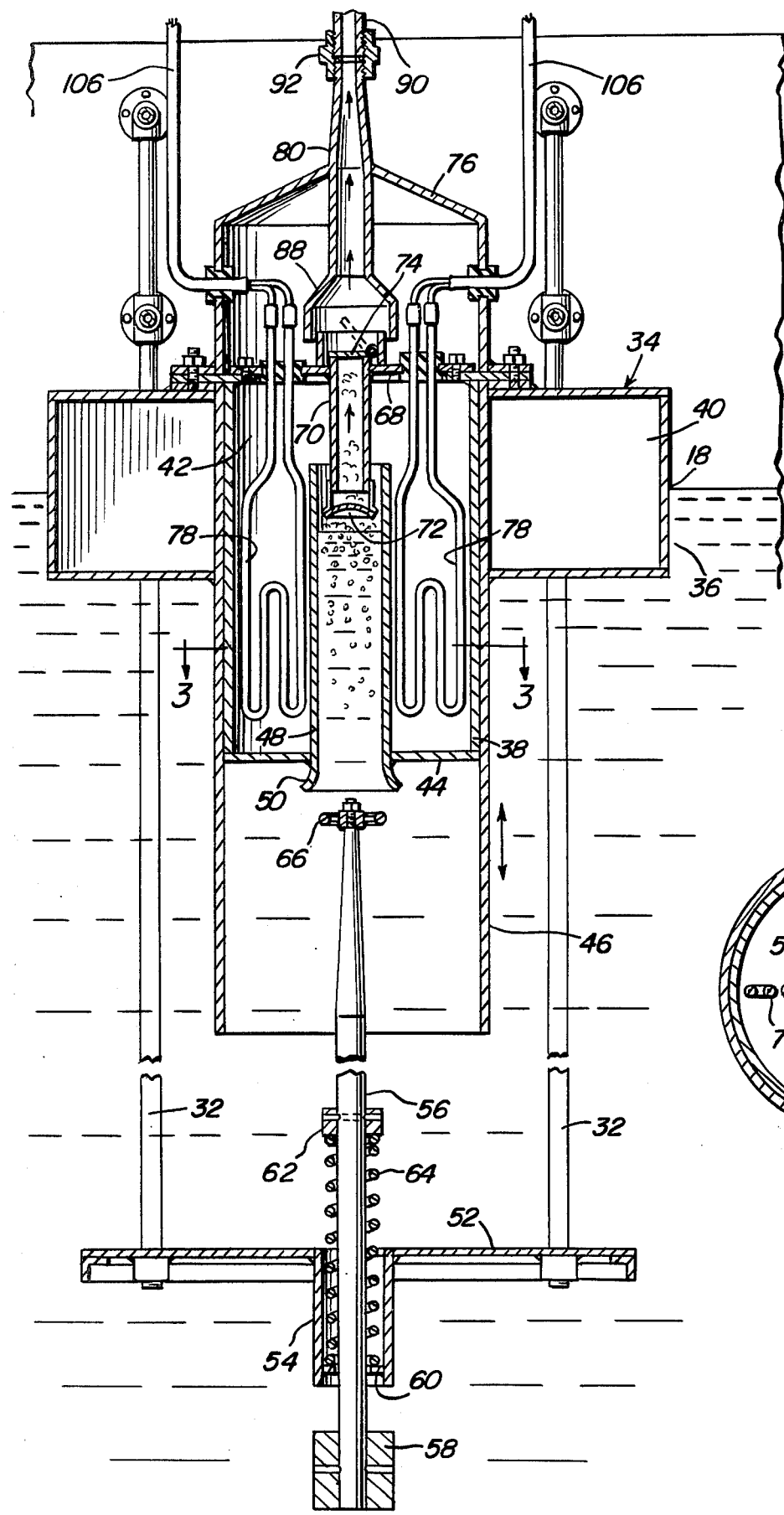
FIG. 2 is a fragmentary, enlarged, vertical sectional view taken substantially upon the plane indicated by the section line 2—2 of FIG. 1.
Figure 3:
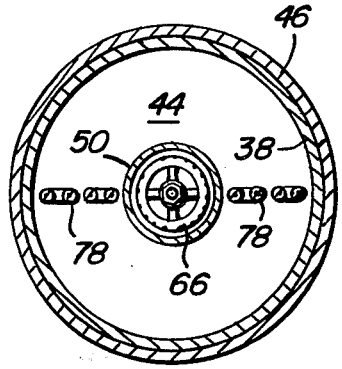
FIG. 3 is a fragmentary, horizontal, sectional view taken substantially upon the plane indicated by the section line 3—3 of FIG. 2.

With reference to FIG. 2, the lower section 28 includes four horizontally equally spaced apart vertical rods 32 between which a float assembly referred to in general by the reference numeral 34 is received. The float assembly 34 comprises a part of the seawater vaporizing section 20 and includes a hollow float member 36 of generally upstanding cylindrical configuration including a central upstanding sleeve 38 sealingly secured therethrough. The sleeve divides the float member 36 into an outer hollow flotation chamber 40 and an inner vapor chamber 42. The lower end of the sleeve 38 is closed by means of a bottom wall 44 and the sleeve 38 includes a downwardly projecting cylindrical skirt 46 defining a downward extension thereof. An upstanding conduit 48 is secured through the central portion of the bottom wall 44 and includes a flared lower end 50. The upper end of the conduit 48 projects upwardly into the vapor chamber 42 to a level above the water level 18 on the exterior of the float assembly 34 and the lower ends of the rods 32 are interconnected and relatively braced by means of a bracing plate 52 through which the lower ends of the rods 32 are secured. The central portion of the bracing plate 52 includes a sleeve 54 secured therethrough and an upstanding rod 56 is slidably received through the sleeve 54. The lower end of the rod 56 below the sleeve 54 is weighted, as at 58, and the lower end of the sleeve 54 includes an inwardly projecting circumferential abutment flange 60. An upper portion of the rod 56 spaced above the bracing plate 52 has a stop collar 62 mounted thereon and a compression spring 64 is disposed about the rod 56 between the collar 62 and the flange 60 and thereby yieldingly biases the rod 56 upwardly toward a predetermined elevated position relative to the bracing plate 52.

The upper end of the rod 56 has a scraping member 66 mounted thereon in vertical alignment with the conduit 48 and spaced slightly below the latter when the float assembly 34 is in an elevated position relative to the lower section 28 of the support structure 12. The scraper member 66 is snugly and slidably receivable within the conduit 48 and projects upwardly thereinto when the float assembly 34 is lowered relative to the lower section 28 of the support structure 12.

The upper end of the sleeve 38 is closed by means of an upper closure wall 68 secured thereover and a short tube 70 is secured downwardly through the closure wall 68 and includes a lower end loosely telescoped within the upper end of the conduit 48. The lower end of the tube 70 supports a horizontal baffle 72 therefrom centrally within the upper end of the conduit 48. The upper end of the tube 70 has a gravity closed flap valve 74 operatively associated therewith and the skirt 46 also extends upwardly through the float member 36 to a point above the closure wall 68 and is closed at its upper end by means of a centrally peaked top wall 76.

A plurality of electrical resistance-type heater elements 78 are disposed within the vapor chamber 42 about the conduit 48 and are disposed in good heat transfer relation with the latter. In addition, the inner surfaces of the sleeve 38 may be reflective and insulation material (not shown) may be interposed between the confronting surfaces of the sleeve 38 and the skirt 46.

The lower end of an outlet pipe 80 is secured centrally downwardly through the top wall 76 and includes an enlarged lower end 88 telescoped downwardly over the upper end of the tube 70. The upper end of the outlet pipe 80 tapers upwardly and is coupled to the lower end of a vertical stand pipe 90, at at 92.

The stand pipe 90 projects upwardly through a central portion of the lower wall 94 of a diametrically enlarged lower end portion 96 of an upstanding pipe 98. The stand pipe 90 projects upwardly into the pipe 98 and the latter is closed at its upper end, as at 100. The upper portion of the lower end portion 96 is defined by a peripherally apertured upper wall 102 downwardly through which the lower end of the pipe 98 is secured and the vertical midportion of the pipe 98 includes a horizontal branch pipe 104 extending outwardly therefrom below the upper extremity of the stand pipe 90 when the float assembly 34 is in an elevated position relative to the lower section 28 of the support structure 12.

Electrical current is supplied to the resistance heating elements 78 by means of flexible conductors 106 including portions 108 thereof supported from the upper section 24 of the support structure 12 by means of expansion springs 110. The lower wall 94 of the lower end portion 96 includes a flexible wiper-type seal through which the stand pipe 90 projects and the end of the branch pipe 104 remote from the pipe 98 opens into the lower end portion of a vertical inlet pipe 112 of the vapor condensing section 22.

The lower wall 94 of the lower end portion 96 includes a drain outlet 114 with which a drain pipe 116 is operatively associated and the lower end of the pipe 112 is closed by means of a bottom wall 118 through which the upper end of a vertical drain pipe 120 is sealingly secured, the lower end of the drain pipe 120 opening into the drain pipe 116.

The vapor condensing section 22 comprises a shallow upwardly opening dish 122 from which there is supported an upwardly tapering conical shell 124. The lower end of the shell 124 is supported in spaced relation above the outer periphery of the dish 122 by means of spacing brackets 126 and the upper end of the pipe 112 is sealingly secured upwardly through the central portion of the dish 122 and projects upwardly into the vertical midportion of the interior of the shell 124. A plurality of progressively upwardly smaller diameter apertured disks 128 are supported within the shell 124 and include central openings formed therethrough through which the upper end of the pipe 112 is received or which are in vertical alignment with and disposed above the upper end of the pipe 112. The upper end of the shell 124 includes a vapor outlet pipe 130 and the pipe 130 extends horizontally outwardly toward one side of the shell 124 and then downwardly into a condensate trap 134. The condensate trap 134 includes a peripherally apertured upper wall 136 corresponding to the upper wall 102 and the lower end of the trap 134 is closed by means of a bottom wall 138 equipped with a drain pipe 140 discharging into the dish 122. The dish 122 includes a drain pipe 142 and the drain pipes 116 and 142 may extend to a common collection point for collecting condensed water.

In operation, the electrical resistance heating elements 78 are supplied with electrical current from a suitable source of electrical potential which may comprise a solar energy powered electrical energy generating apparatus. The electrical resistance heating elements 78 heat the conduit 48 from the exterior thereof and the heat generated by the elements 78 may be reflected inwardly of the sleeve 38 by the reflective inner surface thereon. In addition, heat loss from the sleeve 38 is prevented by the insulation material (not shown) disposed between the outer and inner surfaces of the sleeve 38 and skirt 46.

As the water within the conduit 48 is heated, water vapor rises upwardly from the water and passes around the baffle 72 and enters the tube 70. When the pressure of water vapor within the upper end of the conduit 48, within the tube 70 and within the vapor chamber 42 increases sufficiently, the flap valve 74 is opened and the water vapor passes upwardly through the outlet pipe 80 and into the stand pipe 90 for discharging therefrom into the upper end of the pipe 98. Any water vapor that condenses on the inner surfaces of the pipe 98 flows down the latter and into the lower end portion 96 for drainage therefrom through the outlet 114 and into the pipe 116. In addition, excess pressures being discharged into the pipe 98 may be vented therefrom through the peripherally apertured upper or top wall 102 of the lower end portion 96. The heated water vapor then passes from the pipe 98 through the branch pipe 104 and into the pipe 112. Any water vapor tending to condense on the inner surfaces of the pipe 112 flows down the latter and outwardly from the lower end of the pipe 112 through the pipe 120 and into the pipe 116. The remaining water vapor within the pipe 112 passes upwardly into the shell 124 and is discharged into the latter between the plates 128. Inasmuch as the lower end of the shell 124 is spaced relative to the outer periphery of the dish 122 by means of the spacing brackets 126, ambient air maintains the inner surfaces of the shell 124 and also the plates 128 at a temperature considerably lower than the temperature of the water vapor being discharged into the shell 124 from the pipe 112. Thus, the water vapor discharged into the shell 124 condenses on the inner surfaces thereof and also on the surfaces of the plates 128 and falls downwardly into the dish 122 for drainage therefrom through the pipe 142. The pipe 116 and the pipe 142 may extend to a common collection point for condensed water.

Any water vapor remaining within the shell 124 then passes outwardly theefrom through the outlet 130 and down into the vapor trap 134. The vapor trap 134 serves to further condense water from the water vapor and this condensed water passes from the vapor trap 134 through the pipe 140 and into the dish 122. Any excess pressures remaining in the vapor trap 134 may be vented therefrom through the peripherally apertured top wall 136 of the vapor trap 134.

When the level 18 of the body 16 of water rises and falls, the lower end of the conduit 48 is shifted above the scraper member 66 and telescoped downwardly over the latter, respectively. When the conduit 48 is telescoped downwardly over the scraper member 66, the latter tends to scrap any accumulation of foreign materials tending to build up on the inner surfaces of the conduit 48.

The upper end of the float assembly 34 is guided by the slidable movement of the stand pipe 90 through the central seal carried by the lower wall of the lower end portion 96 of the pipe 98 and the float member 36 is closely embraced by the vertical rods 32 and thus maintained in position for vertical reciprocation relative to the lower section 28 of the support structure 12. If it is desired, the float member 36 may be provided with guides which slidingly or rolling engage the vertical rods 32.

In the event downward telescoping movement of the conduit 48 over the scraper member 66 causes the latter to engage a particularly resistant build up of foreign material within the conduit 48, the downward pressure exerted on the scraper member 66 by the build up on the conduit 48 will cause the rod 56 to bebiased downwardly against the biasing action of the spring 64. Thus, the scraper member 66 is operative to scrap a build up of foreign material from the inner surfaces of the conduit 48, and yet will not cause damage to the float assembly 34 in the event a particularly resistant build up of foreign material within the conduit 48 is encountered by the scraper member 66.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. An apparatus for purifying liquids, said apparatus including a float member defining a hollow chamber therein extending downwardly below the liquid level on the exterior of said float member, vertically elongated conduit means stationarily supported relative to said float member, including an open lower end projecting downwardly below said liquid level and including an upper portion projecting upwardly into said hollow chamber to a level above said liquid level, said conduit means establishing direct communication between the liquid exteriorly of the float member, below said liquid level, and the interior of said chamber above said level, whereby liquid upon which said apparatus is floated by said float member may rise through said conduit means within the latter to said liquid level below the upper end of said conduit means, heating means in said chamber exteriorly of, spaced about and in good heat transfer relation with the exterior of said upper portion below said liquid level, condenser means for condensing liquid vapors, and conveying means communicating the interior of said conduit means above said level with said condenser means for conveying hot liquid vapors from said chamber into said condenser means for condensing therein, said apparatus including a stationary support, said float member being mounted on said support for vertical shifting therealong in response to increases and decreases in the level of liquid in which said float member is floated relative to said stationary support, said stationary support including an upwardly projecting mount aligned with and disposed below the lower end of said conduit means when said float member is in an upper shifted position relative to said stationary support and projecting upwardly into the lower end of said conduit means when said float member is in a lower shifted position relative to said stationary support, the upper end portion of said mount includes scraper means for scraping accumulated scale and the like from the interior of said conduit means in response to shifting of said float member relative to said stationary support.

2. A floatable apparatus for purifying liquids, said apparatus including upstanding conduit means stationarily supported relative to said apparatus, including upper and lower end portions and supported relative to said apparatus for disposition with its lower end portion extending downwardly and opening into a body of a liquid which is to be vaporized and upon which said apparatus is floated, said apparatus including means defining an air chamber about said lower end portion, said conduit means upper end portion opening into said chamber and the lower and upper end portions of said conduit means extending below and above the liquid level on the exterior of said floatable apparatus and within said chamber, respectively, for establishing direct communication between said liquid exteriorly of said apparatus, below said level, and the interior of said chamber above said level, whereby liquid upon which said apparatus is floated may rise through said conduit means within the latter to said level within said chamber below the upper terminal end of said conduit means, heating means supported within said chamber and relative to, in good heat transfer relation with and about the lower end portion of said conduit means within said air chamber for heating said conduit means portion and the liquid disposed therein, condenser means for condensing liquid vapors, conveying means for conveying hot liquid vapors from the upper portion of said conduit means into said conduit means for condensing therein, said condenser means including an upwardly opening catch basin, a hollow cone-shaped shell supported above said basin with the lower periphery of said shell spaced above said basin, a plurality of generally horizontal vertically spaced condensing plates supported in said shell and having apertures formed therethrough, said conveying means opening upwardly through said basin into the interior of said shell, the upper end of said shell including a vapor outlet, a float member, said conduit means being supported from said float member, a stationary support relative to which said float member is operatively associated for vertical shifting relative thereto, said stationary support including an upwardly projecting mount aligned with and disposed below the lower end of said conduit means when said float member is in an upper shifted position relative to said stationary support and projecting upwardly into the lower end of said conduit means when said float member is in a lower shifted position relative to said stationary support, the upper end portion of said mount includes scraper means for scraping accumulated scale and the like from the interior of said conduit means in response to shifting of said float member relative to said stationary support.

3. The combination of claim 2 wherein said condenser means is stationarily supported from said stationary support and said conveying means includes means operative to compensate for shifting of said float member relative to said stationary support.

* * * * *